Figure 1:
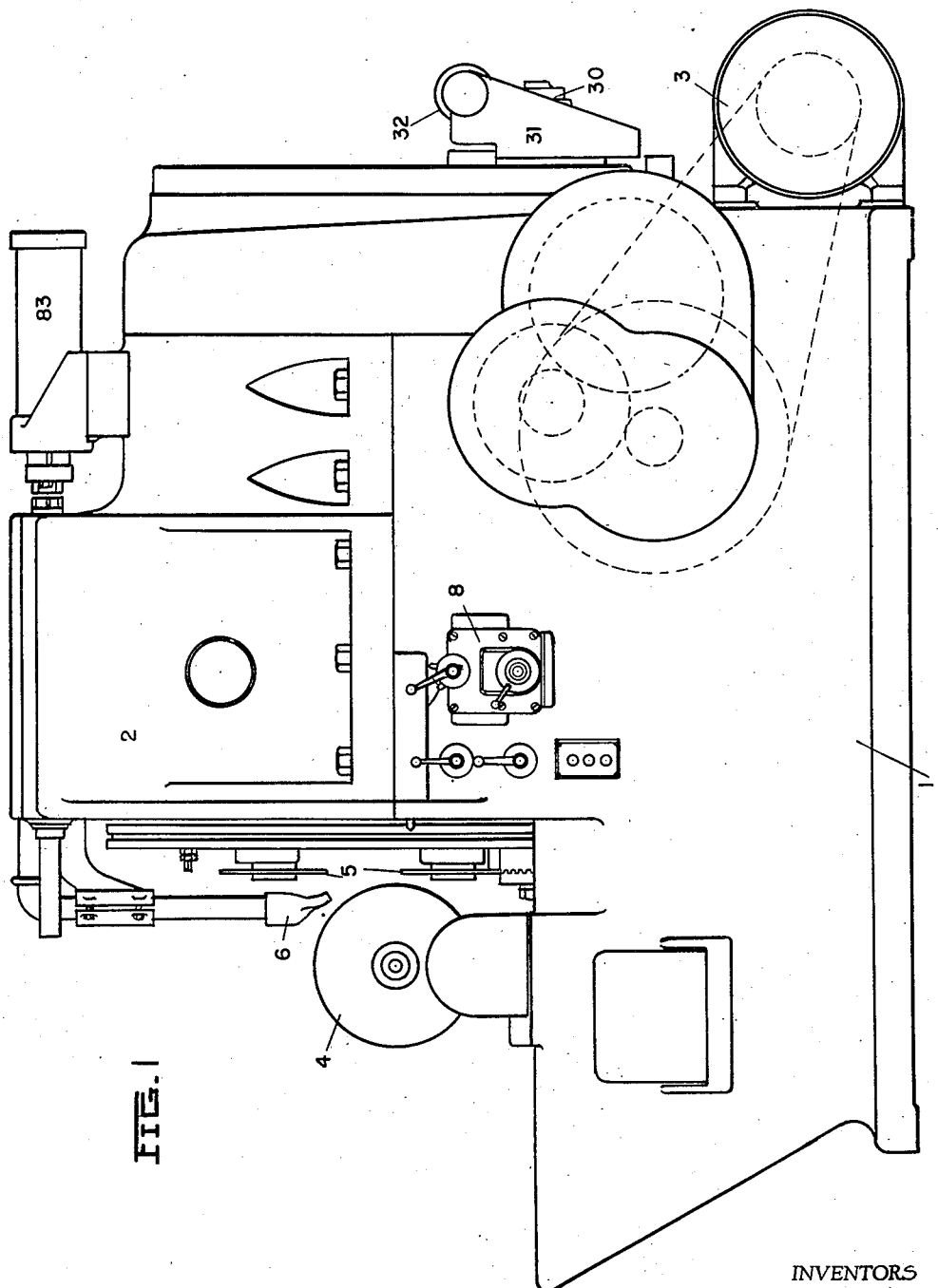

March 2, 1943.  E. R. MOTCH, JR., ET AL  2,312,573
ROTARY TOOL MACHINE
Filed April 26, 1940  4 Sheets-Sheet 3

INVENTORS
EDWIN R. MOTCH Jr. and
JOHAN GUSTAF MOOHL
BY
Oberlin, Limbach & Day
ATTORNEYS.

March 2, 1943.  E. R. MOTCH, JR., ET AL  2,312,573
ROTARY TOOL MACHINE
Filed April 26, 1940  4 Sheets-Sheet 4

INVENTORS
EDWIN R. MOTCH Jr. and
JOHAN GUSTAF MOOH..
BY
Oberlin, Limbach & Day
ATTORNEYS Patented Mar. 2, 1943

2,312,573

UNITED STATES PATENT OFFICE 2,312,573

ROTARY TOOL MACHINE

Edwin R. Motch, Jr., Cleveland, and Johan Gustaf Moohl, Cleveland Heights, Ohio, assignors to The Motch & Merryweather Machinery Company, Cleveland, Ohio, a corporation of Ohio Application April 26, 1940, Serial No. 331,746

6 Claims. (Cl. 29—70)

The present invention relates to a machine tool wherein a plurality of rotary tools, such as saws, milling cutters or grinding wheels, are mounted on a rotatable member or face plate and circumferentially spaced about the work-piece, which is located at the center of the face plate. These rotary tools are rotated about their own individual axes and also traversed around the periphery of the work by virtue of the rotation of the face plate. In addition to the traverse or circumferential travel of the tools, an infeed and outfeed movement is imparted to them whereby they are moved bodily inwardly and outwardly with respect to the work, such latter movement being effected through the medium of a second rotatable member or cam plate. In our prior U. S. Patent No. 2,103,486, we have disclosed and claimed a rotary tool machine of the foregoing generally indicated characteristics, and in our copending application, Serial No. 297,732, filed October 3, 1939, now Patent No. 2,281,450, granted April 28, 1942, we have disclosed an improvement on such machine, consisting in the adaptation of fluid-actuated power means for effecting various tool movements. The invention of our present application constitutes, in turn, a still further improvement upon our aforesaid prior patent and pending application.

The general object and nature of our present invention is to provide an improved construction for a rotary tool machine of the character indicated, wherein the factors of operative control, efficiency and production capacity are enlarged upon and increased. More particularly, the present invention includes a novel construction for moving the cam plate with respect to the face plate and by fluid pressure actuation. The invention also includes a fluid-actuated or hydraulic motor driving means adapted to transmit their driving power directly to the rotation of both rotatable members, viz., the face plate and the cam plate, such motor drives being individual to each plate. In our aforesaid co-pending application Serial No. 297,732, we have taught the advantage incident to the utilization of a fluid-actuated power means in order to automatically compensate for irregularities in the texture of the work-piece and to produce a smoother and more efficient cutting action. Such efficiency and smoothness of action is still further improved by reason of the present invention embodying the individual fluid drive means connected directly to the face plate and cam plate, respectively.

Our invention also achieves the additional object and advantage of providing novel means for accelerating or decelerating the normal rate of rotation of the cam plate with respect to the face plate, in order to accomplish the function of producing infeed (or outfeed) movement of the rotary tools.

To the accomplishment of the foregoing and related ends, said invention, then consists of the means hereinafter fully described and particularly pointed out in the claims. The annexed drawings and the following description set forth in detail certain mechanism embodying the invention, such disclosed means constituting, however, but one of various mechanical forms in which the principle of the invention may be used.

Figure 2:
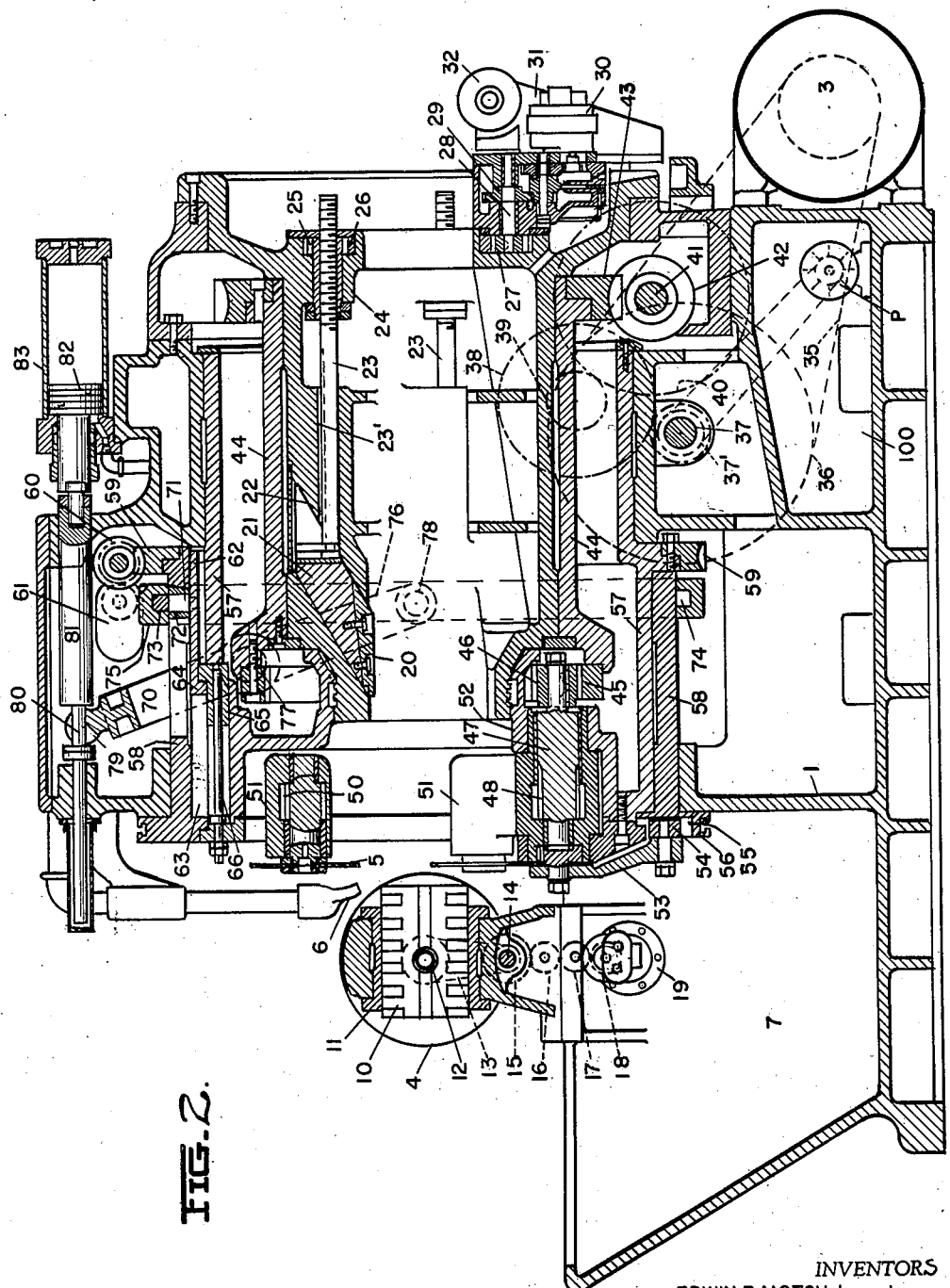
Figure 3:
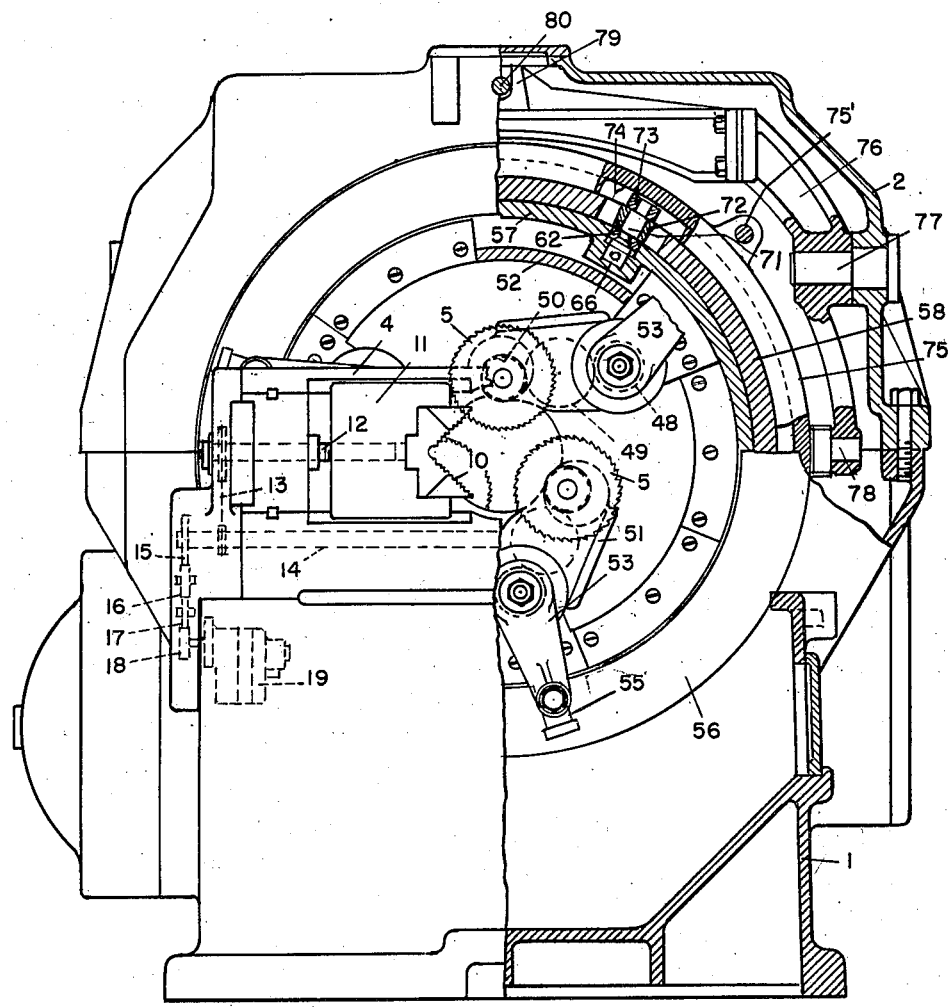
Figure 4:
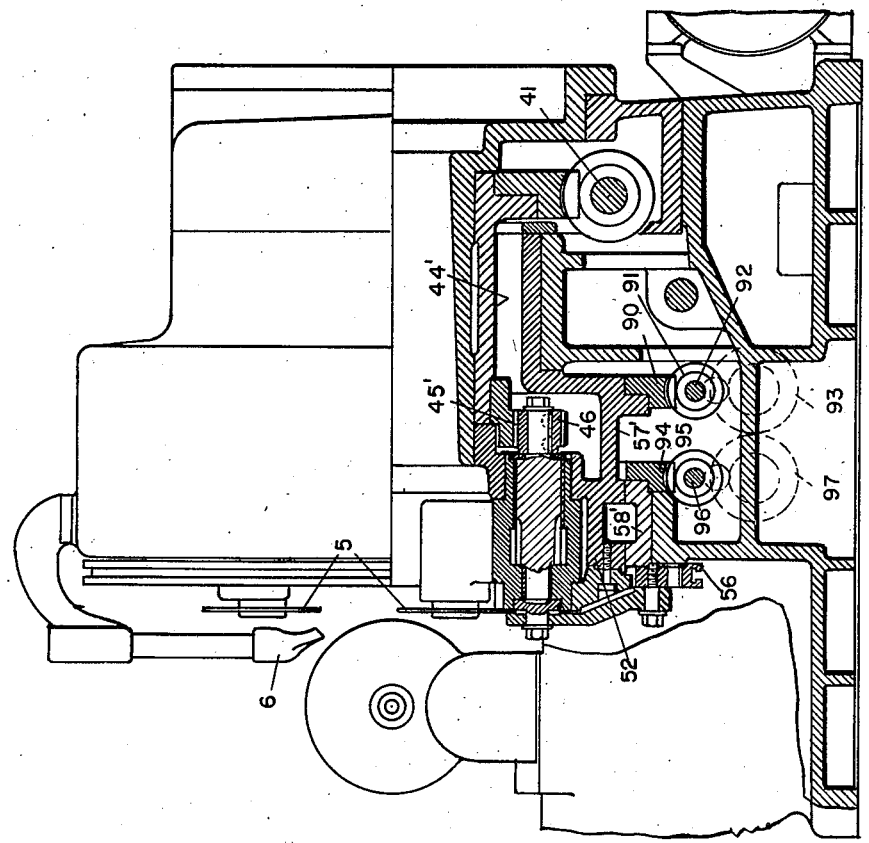
Figure 5:
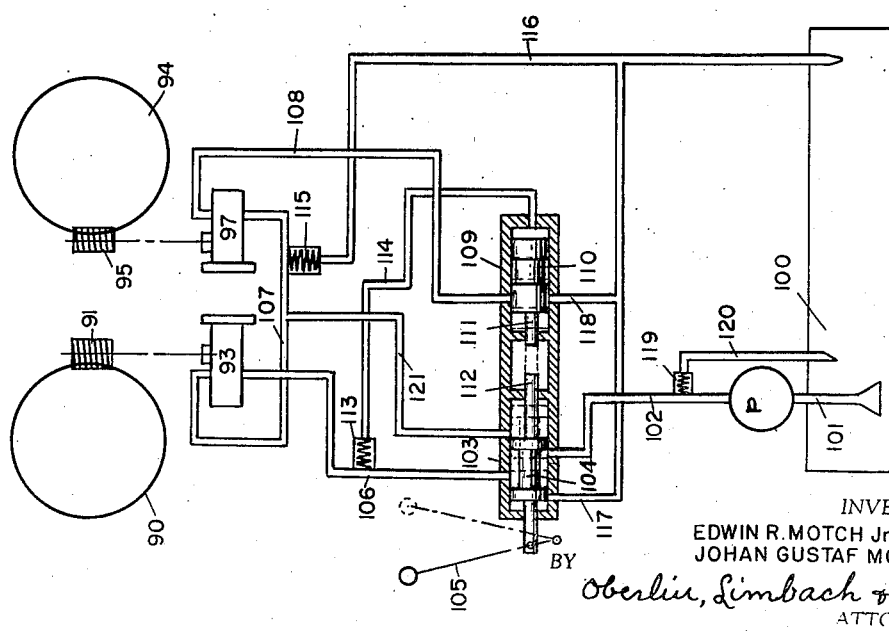

In said annexed drawings:

Fig. 1 is a side elevational view of the rotary tool machine embodying the principle of our invention; Fig. 2 is a vertical, sectional view of the machine shown in Fig. 1; Fig. 3 is an end elevational view, partially broken away and partially in section, of the machine of Figs. 1 and 2; Fig. 4 is a side elevational view, partially in section, of a modified form of construction of the machine; and Fig. 5 is a diagram illustrating the hydraulic motor control system applied to the machine of Fig. 4.

Now referring more particularly to Fig. 1, the machine shown therein consists essentially of a base frame 1 carrying the upper housing frame 2, the electric drive motor 3, the external or "outboard" chuck housing 4 and the rotary tools 5.

The coolant fluid nozzle 6 is located adjacent the rotary tools 5 and is for the purpose of directing a stream of cooling and lubricating fluid, such as an oil or soap emulsion onto the work. A reservoir 7 is located in one end of the frame 1 for receiving such coolant fluid and turnings and cuttings from the work. Control levers and buttons are located on the side of the machine, as generally indicated at 8.

Now directing attention to Figs. 2 and 3, the outboard chuck jaws 10 (only one of which is shown) are carried in slides 11 mounted in the outboard housing 4. Feed screws 12 connected to each of the slides 11 effect the movement of the latter, together with the chuck jaws 10. The feed screws 12 are rotated by means of a chain and sprocket connection 13 to the cross shaft 14, which, in turn, is rotated through the gears 15, 16 and 17 from the drive pinion 18 of the fluid motor 19. Operation and control of the fluid motor 19 is, of course, accomplished by means of a control lever mounted on the side of the machine at 8, in a manner and by hydraulic pressure connections well known to those skilled in the art, thus, not necessitating further detailed description here.

The inboard chuck jaws 20 are carried by slides 21 moving in the inclined ways 22, which are, in turn, located in a stationary portion of the machine, viz., the base frame 1. Draw bars 23 are slidably mounted in the frame 1 and keyed against rotation with respect thereto, such as by means of the elongated key slot 23' and are threadably engaged at their outer ends by the longitudinally fixed feed nuts 24. The feed nuts 24 carry a pinion 25 engaging with the external tooth ring gear 26, which is driven by means of the pinion 27 on the shaft 28 through the gear train, indicated generally at 29, by means of the fluid motor 30.

The outboard bracket 31 carries a roller 32 for supporting the work as it is fed into the machine to be gripped by the chuck jaws 10 and 20.

The electric drive motor 3 is connected by means of the belt 35 to the pulley 36 on the cross shaft 37, which carries the gear 37'. The gear 37' is drivably connected through the idler gears 38 and 39 to the gear 40 on the worm shaft 41. The worm 42 on the worm shaft 41 meshes with the worm wheel 43 mounted upon the righthand end of the rotatable sleeve 44. The internal tooth ring gear 45 is carried by the lefthand end of the rotatable sleeve 44 and meshes with the epicyclic or planetary gears 46 on the shafts 47, which, in turn, have the pinions 48 meshing with the idler gears 49 connected to the pinions 50 on the individual drive shafts carrying the rotary tools 5. The rotary tools 5 and their drive shafts are supported in the housings 51 which are pivotally mounted in the rotatable member or face plate 52. Connecting arms 53 are connected to the housings 51 at the point of pivotal support and carry on their outer ends rollers 54 which are received in radial slots 55 in the cam plate 56. Relative rotation between the plates 52 and 56 will cause a pivotal movement of the housings 51 through the medium of the rollers 54 on the ends of the arms 53 moving in the slots 55. Thus, referring to Fig. 3, as the plate 56 moves in a counterclockwise direction with respect to the plate 52, the slot 55 will be moved further away from the point of pivotal mounting of the housings 51 and connecting arms 53, causing the rollers 54 to move radially inward in the slots 55 and effecting counterclockwise, pivotal movement of the housings 51 about their pivotal mounting points, thus moving the ends of the housings 51 carrying the tools 5 in a radially inward direction. Such pivotal movement, of course, constitutes the infeed and outfeed movement of the rotary tools 5.

The face plate 52 has a longitudinally extending portion or barrel 57. The cam plate 56 also has a barrel 58 partially overlying the barrel 57. The barrel 57 carries a worm wheel 59 driven by the worm 60. The barrel 58 is normally rotatable with the barrel 57. The worm 60, in turn, is mounted upon a shaft connected to the pinion drive gear of the fluid motor 61.

An elongated key 62 is longitudinally movable in the slot 63 in the barrel 57. It will be noted that the key 62 has a laterally projecting lug 64 adapted to engage with a similar lug on the limit stop 65. The limit stop 65 is movable in an axial direction, or in a direction parallel to the longitudinal movement of the key 62, by means of the threaded adjusting bolt 66.

The barrel 58 contains a slot 70 which is angularly inclined to the axis of rotation. A pin 71 carries a roller 72 engaging in the slot 70 and also connects to a shoe 73 which is adapted to travel around in the groove or channel 74 in the shifting ring 75. The inner end of the pin 71 is fixedly attached to the key 62. Thus, the extent of movement of the pin 71 and roller 72 in the inclined slot 70 is limited and regulated by the position of the limit stop 65.

A shifting yoke 76 is pivotally mounted to the upper housing 2, as indicated at 77. The lower arms of the yoke 76 are povotally connected at 78 to the shifting ring 75. The upper portion or "throat" of the yoke 76 has a saddle 79 which, by means of its engagement with the shoulders formed by the reduced portion 80 on the connecting rod 81, is operatively connected to the latter so that reciprocal movement of the connecting rod 81 will effect rocking movement of the yoke 76 and, in turn, produce an axial, lateral movement of the shifting ring 75. Such shifting movement of the ring 75 is guided and maintained in proper alignment by means of fixed supporting bars, such as shown at 75' engaged by drilled bosses or ears on the ring 75. This shifting movement of the ring 75, due to the engagement of the pin 71 and roller 72 in the inclined slot 70, will correspondingly produce rotation of the barrel 58 and cam plate 56, whether the latter be stationary or rotating with the barrel 57 of the face plate 52. In this manner, relative rotation, or acceleration or deceleration of the rate of rotation of the cam plate 56 with respect to the face plate 52 is produced, with incident infeed or outfeed of the rotary tools 5 with respect to the work-piece. The preliminary setting of the position of the cam plate 56 with respect to the face plate 52, as well as the amount of infeed or outfeed, is controlled by the adjustment of the position of the limit stop 65.

The connecting rod 81 leads to the piston 82 reciprocable in the hydraulic cylinder 83. Control of fluid pressure introduced to the cylinder 83 thus effects the above-described infeed and outfeed of the rotary tools 5.

In the alternative form of construction shown in Figs. 4 and 5, the cam plate does not derive its rotative movement through transmission from the face plate, but rather from an individual fluid motor connected directly to it. The change in relative rates of rotation of the face plate and cam plate is obtained by reason of control of the fluid pressure to each of the prime moving fluid motors connected to the individual plates. Directing attention to Fig. 4, it will be seen that the cross shaft 41 drives the sleeve 44', carrying the external tooth ring gear 45' meshing with the epicyclic gear 46 to drive the rotary tools 5 about their individual axes, much in the same manner as previously described in connection with the form of construction of Figs. 1, 2 and 3. The barrel 57' on the face plate 52 carries the worm wheel 90 meshing with the worm 91. The worm 91 is mounted upon a shaft 92 to which is connected the drive pinion of the fluid motor 93.

The barrel 58' of the cam plate 56 likewise carries a worm wheel 94 meshing with the worm 95 on the shaft 96 driven by the drive pinion of the second fluid motor 97.

The fluid pressure, control valve and conduit system for actuating the drive motors 93 and 97 is illustrated in the diagram of Fig. 5. The pressure pump P (which is driven from shaft 37, as shown in Fig. 2) delivers hydraulic fluid such as oil from the reservoir 100 through the intake 101 to the outlet conduit 102. The conduit 102 connects to the valve body 103 in which the "spool" or "dumb-bell" valve 104 is located. A manual operating lever 105 is connected to the projecting end of the "dumb-bell" valve 104 for reciprocation of the latter within the valve body 103. The conduit 106 leads from the valve body 103 to the drive motor 93. The conduit 107 connects the drive motor 93 in series flow relationship with the drive motor 97. The conduit 108 leads to the valve body 109 adjacent the valve body 103. The "dumb-bell" piston 110 is reciprocable within the valve body 109 and has a projecting stem portion 111 adapted to contact a similar projecting stem 112 on the "dumb-bell" valve 104.

A relief valve 113 connects the conduit 106 to the conduit 114 which leads to the righthand end of the valve body 109. The relief valve 115 connects the conduit 107 to the return conduit 116, to the reservoir 100. The return conduits 117 and 118 are connected in parallel to the valve bodies 104 and 110 respectively, and join with the return line 116.

A relief valve 119 connects the conduit 102 to the return conduit 120 to the reservoir 100.

The valve 119 is set at the predetermined maximum pressure which is to be delivered from the pump P to the above-described valve and conduit pressure system. The relief valve 113 is set at a predetermined pressure below that of the valve 119 and the relief valve 115, in turn, is set at a slightly lower predetermined pressure. Thus, for the purpose of convenience of explanation of the mode of operation of the control system, let it be assumed that the valve 119 is set at 700 pounds per square inch, the valve 113 at 600 pounds per square inch and the valve 115 at 500 pounds per square inch. The operation of the control system will then be as follows: The operating lever 105 is set at the full line position, whereupon, fluid under pressure is conducted from the conduit 102 to the valve 103, to the conduit 106, to the drive motor 93. The worm 91 commences to drive the worm wheel 90 and the face plate 52. Exhaust pressure from the motor 93 is led through the conduit 107 to the motor 97. However, the motor 97 cannot operate or pass fluid pressure through it because its exhaust conduit 108 is closed by the "dumb-bell" valve 110. Thus, there will occur relative rotation between the face plate 52 and the temporarily stationary cam plate 56, causing infeed of the rotary tools 5. The relief valve 115 is set at the minimum predetermined pressure for effecting the required drive of the motor 93 and face plate 52, and in our assumed instance, is 500 pounds per square inch. Thus, exhaust fluid from the motor, at 500 pounds per square inch pressure, will be conducted through the relief valve 115 to the return line 116, to the reservoir 100.

As the relative rotation between the face plate 52 and the cam plate 56 approaches its limit, or in the event that some unforseen resistance to increased infeed occurs, such as an irregularity due to texture or shape in the work-piece, the pressure in the conduit 106 will build up until the relief valve 113 operates (at our assumed pressure of 600 lbs. per square inch) and conducts pressure through the conduit 114 to the righthand end of the valve body 109, shifting the "dumb-bell" valve 110 to a lefthand position as indicated by the dotted lines in Fig. 5. At this new position of the valve 110, the exhaust line 108 of the motor 97 will be opened to the return line 118, thus permitting driving rotation of the motor 97 and cam plate 56.

Rotation of the face plate 52 and of the cam plate 56 is thus continued until the end of the cutting or machining operation, such as cutting off a section of pipe, for example. At this point, the lever 105 is shifted to the dotted line position in Fig. 5, moving the "dumb-bell" valve 104 to the dotted line position and the "dumb-bell" valve 110 to the full line position. Pressure from the conduit 102 will then be led to the conduit 121, to the conduit 107, to the opposite side of the drive motor 93, thus tending to reverse its direction of rotation. The conduit 106 then becomes the exhaust line from the motor 93, to the valve 103, to the exhaust line 117, to the reservoir 100. The valve 110 being again in full line position, the line 108 is shut off and the motor 97 thus prevented from rotation, so that the cam plate 56 will be held stationary and outfeed movement of the tools 5 effected. At the end of such outfeed movement, with incident resistance to further rotation of the face plate 52, pressure will be built up in the conduits 102 and 106 until relieved by the opening of the relief valve 119, to the return line 120. Pressure through the relief valve 113 and conduit 114 will not be effective in this instance to shift the valve 110, since it is held against such shift by abutment with the end 112 of the valve 104, in turn held by the lever 105. The control system and machine is then ready for a repeat cycle of operations.

Other modes of applying the principle of our invention may be employed instead of the one explained, change being made as regards the mechanism herein disclosed, provided the means stated by any of the following claims or the equivalent of such stated means be employed.

We, therefore, particularly point out and distinctly claim as our invention:

1. In a rotary tool machine, the combination of a rotatable member, a plurality of rotatable tools, means supporting said tools on said rotatable member for bodily movement towards and away from a common center, mechanical power drive means for rotating said tools about their own axes, fluid power means for rotatably driving said rotatable member, a second rotatable member mounted concentrically with said first rotatable member, a second fluid power means for rotatably driving said second rotatable member at a different rate of rotation than said first rotatable member, and means interconnecting said second rotatable member and said supporting means so constructed and arranged as to effect the aforesaid bodily movement of said tools on relative rotation of said rotatable members.

2. In a rotary tool machine, the combination of a rotatable member, a plurality of rotatable tools, means supporting said tools on said rotatable member for bodily movement towards and away from a common center, mechanical power drive means for rotating said tools about their own axes, a second rotatable member mounted concentrically with said first rotatable member, means interconnecting said second rotatable member and said supporting means so constructed and arranged as to effect the aforesaid bodily movement of said tools on variation in the relative rotative positions of said rotatable members, and fluid motors drivably connected to each of said rotatable members.

3. In a rotary tool machine, the combination of a rotatable member, a plurality of rotatable tools, means supporting said tools on said rotatable member for bodily movement towards and away from a common center, mechanical power drive means for rotating said tools about their own axes, a second rotatable member mounted concentrically with said first rotatable member, means interconnecting said second rotatable member and said supporting means so constructed and arranged as to effect the aforesaid bodily movement of said tools on variation in the relative rotative positions of said rotatable members, and a pair of fluid drive motors and a worm and gear drive train connecting each of said motors to each of said rotatable members.

4. In a rotary tool machine, the combination of a rotatable member, a plurality of rotatable tools, means supporting said tools on said rotatable member for bodily movement towards and away from a common center, mechanical power drive means for rotating said tools about their own axes, a second rotatable member mounted concentrically with said first rotatable member, means interconnecting said second rotatable member and said supporting means so constructed and arranged as to effect the aforesaid bodily movement of said tools on variation in the relative rotative positions of said rotatable members, fluid motors drivably connected to each of said rotatable members, and means for controlling the relative velocities of said fluid motors.

5. In a rotary tool machine, the combination of a rotatable member, a plurality of rotatable tools, means supporting said tools on said rotatable member for bodily movement towards and away from a common center, mechanical power drive means for rotating said tools about their own axes, a second rotatable member mounted concentrically with said first rotatable member, means interconnecting said second rotatable member and said supporting means so constructed and arranged as to effect the aforesaid bodily movement of said tools on variation in the relative rotative positions of said rotatable members, fluid motors drivably connected to each of said rotatable members, a single pressure source, and means for introducing a predetermined maximum amount of pressure from said source to one of said fluid motors and a predetermined minimum amount of pressure in series flow therefrom to the other of said motors.

6. In a rotary tool machine, the combination of a rotatable member, a plurality of rotatable tools, means supporting said tools on said rotatable member for bodily movement towards and away from a common center, mechanical power drive means for rotating said tools about their own axes, a second rotatable member mounted concentrically with said first rotatable member, means interconnecting said second rotatable member and said supporting means so constructed and arranged as to effect the aforesaid bodily movement of said tools on variation in the relative rotative positions of said rotatable members, fluid motors drivably connected to each of said rotatable members, a single pressure source adapted to deliver fluid at a predetermined maximum pressure, valve and conduit means adapted to connect said pressure to both of said motors in series flow, a relief valve for regulating the minimum amount of pressure deliverable to the second of said motors in such series flow, and a second valve means for opening the exhaust of said second motor when the pressure delivered to said first motor in such series becomes greater than said minimum amount of pressure.

EDWIN R. MOTCH, Jr.
JOHAN GUSTAF MOOHL.